United States Patent
Mauro et al.

(10) Patent No.: US 8,010,781 B2
(45) Date of Patent: *Aug. 30, 2011

(54) METHOD AND SYSTEM TO ACCELERATE CRYPTOGRAPHIC FUNCTIONS FOR SECURE E-COMMERCE APPLICATIONS

(75) Inventors: Anthony P. Mauro, San Diego, CA (US); James J. Willkie, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 11/937,449

(22) Filed: Nov. 8, 2007

(65) Prior Publication Data

US 2008/0183883 A1      Jul. 31, 2008

Related U.S. Application Data

(63) Continuation of application No. 09/828,556, filed on Apr. 5, 2001, now Pat. No. 7,305,092.

(51) Int. Cl.
*G10L 15/00* (2006.01)
*H04K 1/00* (2006.01)
*H04L 9/00* (2006.01)
*H04L 29/06* (2006.01)
*H04L 1/00* (2006.01)
*G06F 15/78* (2006.01)
*G06F 13/12* (2006.01)

(52) U.S. Cl. .......... 713/151; 713/164; 713/165; 380/28; 380/247; 380/270; 704/275

(58) Field of Classification Search ................... 713/151, 713/164, 165; 380/270, 28, 247; 704/275
See application file for complete search history.

(56) References Cited

U.S. PATENT DOCUMENTS

| | | | |
|---|---|---|---|
| 5,230,020 A | 7/1993 | Hardy et al. |
| 5,365,590 A | 11/1994 | Brame |
| 5,592,555 A | 1/1997 | Stewart |
| 5,592,556 A | 1/1997 | Schwed |
| 5,594,797 A | 1/1997 | Alanärä et al. |
| 5,602,916 A | 2/1997 | Grube et al. |
| 5,689,568 A | 11/1997 | Laborde |

(Continued)

FOREIGN PATENT DOCUMENTS

EP   0363173   4/1990

(Continued)

OTHER PUBLICATIONS

Stephan Rupp, Franz-Josef Banet, Rodolfo-Lopez Aladros, Gerd Siegmund; "Flexible Universal Networks—A New Approach to Telecommunication Services?"; Apr. 2004; Wireless Personal Communications: An International Journal, vol. 29 Issue 1-2; Publisher: Kluwer Academic Publishers; pp. 47-61.*

(Continued)

*Primary Examiner* — Michael Pyzocha
*Assistant Examiner* — Courtney D Fields
(74) *Attorney, Agent, or Firm* — Won Tae Kim (57) ABSTRACT

A device and method for accelerating functioning of a software application having multi-layer, high overhead protocols, wherein the device has a first processor operating a software application having a multi-layer protocol; a second processor configured to operate at least one layer of the multi-layer protocol; and a memory accessible to each of the processor and the second processor.

14 Claims, 6 Drawing Sheets

U.S. PATENT DOCUMENTS

| | | | |
|---|---|---|---|
| 5,754,957 | A | 5/1998 | Khan |
| 5,787,180 | A | 7/1998 | Hall et al. |
| 5,887,251 | A | 3/1999 | Fehnel |
| 5,905,949 | A | 5/1999 | Hawkes et al. |
| 5,923,761 | A | 7/1999 | Lodenius |
| 5,940,515 | A | 8/1999 | Kasavaraju |
| 6,088,800 | A * | 7/2000 | Jones et al. ............ 380/28 |
| 6,144,848 | A | 11/2000 | Walsh et al. |
| 6,151,677 | A | 11/2000 | Walter et al. |
| 6,212,576 | B1 | 4/2001 | King |
| 7,006,974 | B2 * | 2/2006 | Burchard et al. ............ 704/275 |
| 2002/0112167 | A1 * | 8/2002 | Boneh et al. ............ 713/182 |

FOREIGN PATENT DOCUMENTS

| | | |
|---|---|---|
| EP | 0442041 | 8/1991 |
| EP | 1809063 A1 * | 7/2007 |
| WO | WO9926387 A1 | 5/1999 |
| WO | WO0105086 A2 | 1/2001 |
| WO | WO2005082040 A2 | 9/2005 |

OTHER PUBLICATIONS

3Com, "3Com Launches New Era of Network Connectivity," Online, Jun. 1999, pp. 1-3.

Barrett, Paul, "Implementing the Rivest Shamir and Aleman Public Key Encryption Algorithm on a Standard Digital Signal Processor," Computer Security LTD, Aug. 1986, pp. 311-323.

D. Arora et al., "Software Architecture Exploration for High-Performance Processing on a Multiprocessor Mobile SoC", Proceedings of the 43rd Annual conference on Design Automation DAC '06, Jul. 2006, pp. 496-501.

International Search Report—PCT/US2001/047762—International Search Authority, European Patent Office,Mar. 11, 2003.

* cited by examiner

Fig. 6 understanding of the present invention, preferred embodiments thereof will now be described, simply as

METHOD AND SYSTEM TO ACCELERATE CRYPTOGRAPHIC FUNCTIONS FOR SECURE E-COMMERCE APPLICATIONS

CLAIM OF PRIORITY UNDER 35 U.S.C. §120

The present application for patent is a Continuation of patent application Ser. No. 09/828,556 entitled "Method and System to Accelerate Cryptographic Functions for Secure E-Commerce Applications" filed Apr. 5, 2001, now allowed, and assigned to the assignee hereof and hereby expressly incorporated by reference herein.

FIELD OF THE INVENTION

The present invention relates to mobile communication devices, and, in particular, to circuits for implementing security protocols.

BACKGROUND OF THE INVENTION

The use of mobile devices for e-commerce becomes more common every day. E-commerce raises a need for security to protect the customer's assets, usually a credit card number. Currently, several protective security protocols exist, such as the secure socket layer (SSL), internet protocol security (IPSec), and the security layer within the wireless application protocol (WAP). A version of the SSL protocol was designed with input from industry and public reviews, and has been published as an internet draft document. After a consensus was reached, a transport layer security (TLS) working group was formed to develop a common standard using official openSSL source code and documentation. A first revision of TLS protocol is essentially the same as the SSL protocol as developed by a private organization. The website (www-dot-openSSL-dot-org) currently retains links to the official openSSL source code and documentation.

IPSec provides the ability to secure communications across a local area network (LAN), across private and public wide area networks, and across the internet. IPSec is controlled by an internet engineering task force (IETF). The website (www-dot-ietf-dot-org) currently retains links to official IPSec specifications. RFC 1825 is the architecture specification; other relevant specifications include RFC1826-RFC1830.

The WAP protocol is a result of an effort by a wireless application protocol forum to promote industry-wide specifications for technology useful in developing applications and services that operate over wireless communication networks. The application framework and network protocols for wireless devices such as mobile telephones, pagers, and personal digital assistants, as specified by the wireless application protocol forum are well known. The website (www-dot-wapforum-dot-org) presently retains links to official WAP specifications.

The mobile device must implement one or more of these complex protocols to protect the customer's assets. Complex encryption and authentication algorithms exist within the security protocols. High performance computing engines are typically required to implement the functions within these algorithms with a minimum of delay. This high performance is available in today's mobile devices only at an increased cost to the consumer.

SUMMARY OF THE INVENTION

The present invention provides a mobile device and circuit that helps to accelerate the complex encryption and authentication algorithms exist within the security protocols by partitioning the cryptographic layers and distributing them to a second processor, such as a digital signal processor. The present invention thereby provides a high performance computing engine that implement the functions within these algorithms with a minimum of delay and a minimum cost to the consumer.

According to one aspect of the invention, the invention provides a mobile device including a first processor configured to operate a software application having a multi-layer protocol; a second processor configured to operate at least one layer of the multi-layer protocol; and a memory accessible to each of the processor and the second processor.

According to various other aspects of the invention, the first processor of the device is a central processing unit, or CPU, and second processor is a digital signal processor, or DSP. The layer of the multi-layer protocol that is handed-off to the DSP is preferably a complex mathematical algorithm, such as a modular math function. According to preferred embodiments of the invention, the modular math function is an exponentiation function.

Functionally, the CPU preferably operates one predetermined portion of the security protocol, and the DSP operates a second predetermined portion. The DSP operates its portion of the security protocol on data from the CPU in response to a command from the CPU. The DSP operates the second portion of the security protocol using a modular math function, and returns both the result of the function and an interrupt signal to the CPU.

BRIEF DESCRIPTION OF THE DRAWINGS

For a better understanding of the present invention, preferred embodiments thereof will now be described, simply as non-limiting examples, with reference to the attached drawings, wherein.

DETAILED DESCRIPTION OF THE PREFERRED EMBODIMENTS

The invention is a method and device for partitioning and implementing various acceleration functions in a wireless communication device. The device of the invention performs the functions of a coprocessor which off-loads the central processing unit (CPU) and accelerates functions that are better suited to processing by a digital signal processor (DSP). Thus, while the invention is described herein in terms of a method and device for partitioning and implementing a cryptographic acceleration function utilizing SSL protocols, the invention is equally applicable to partitioning security services functions generally, whether utilizing SSL protocols or another protocol, such as IPSec, WAP, TLS, or another protocol. The method and device of the invention are further equally applicable without modification to the partitioning and accelerating of other multi-layer, high-overhead protocols, including for example, image processing, voice recognition, and audio signal processing.

According to one exemplary embodiment of the invention, security services architecture in an e-commerce implementation of the present invention is partitioned between two processor cores: a host central processing unit (CPU) and a digital signal processor (DSP).

Figure 1:
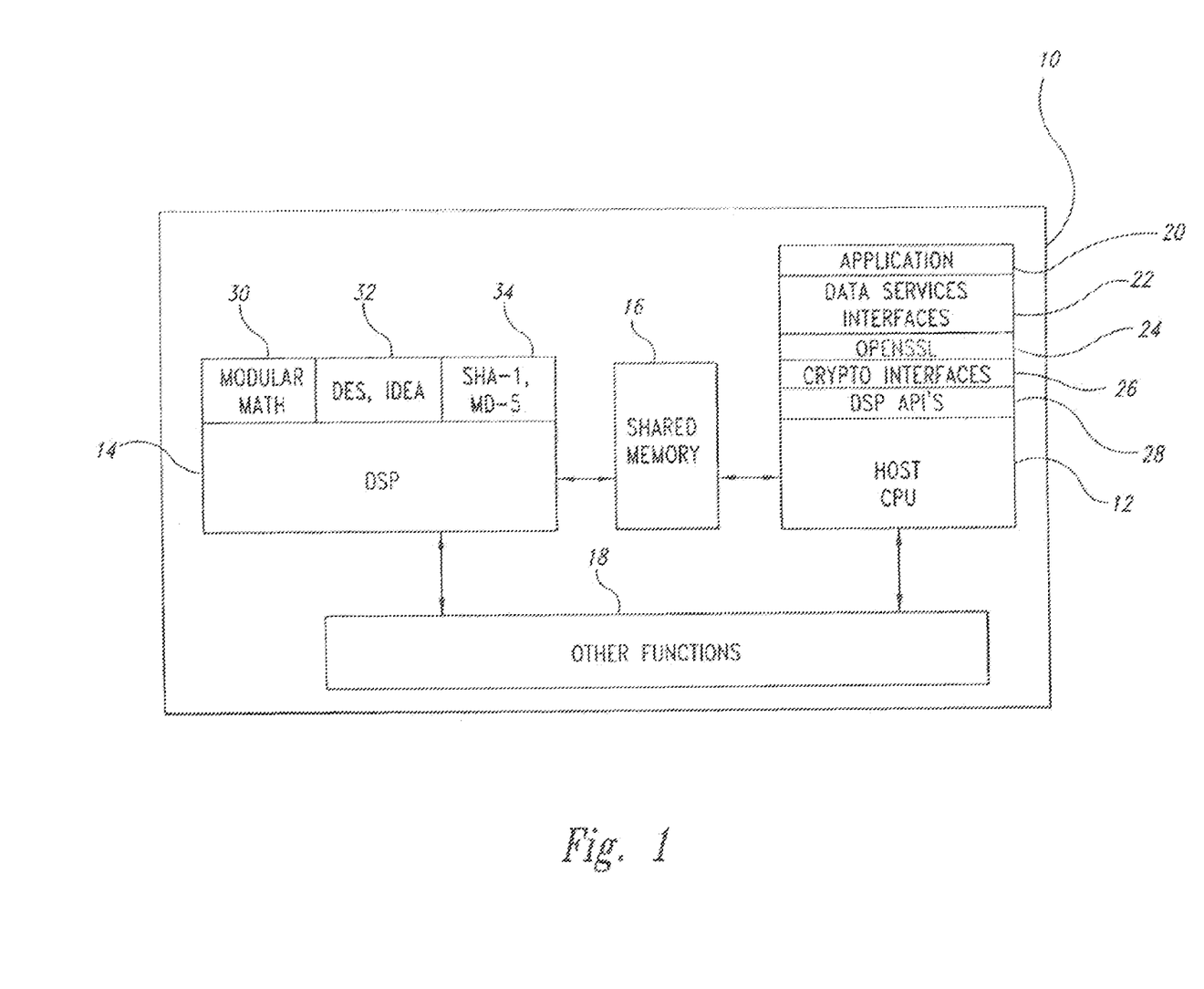
FIG. 1 illustrates the general architecture and partitioning according to one embodiment of the invention.

FIG. 1 illustrates the general architecture and partitioning of the invention. In FIG. 1, an exemplary block diagram is provided for the partitioning and accelerating of security services functions, for example, in an application utilizing SSL protocols. The circuit described in FIG. 1 is alternatively implemented in discreet components or in a hybrid combination of discrete components and one or more application-specific integrated circuits (ASIC). In some applications, optimum performance is achieved most effectively by manufacturing the circuit as a single ASIC processing chip. According to one embodiment of the invention useful for implementing a cryptographic acceleration function, the security services architecture is partitioned in a circuit 10 between two processor cores: a host central processing unit (CPU) 12 and a digital signal processor (DSP) 14. A shared memory segment 16 is coupled between the CPU 12 and the DSP 14 and is simultaneously available to each application. One or both of the CPU 12 and the DSP 14 is optionally coupled to communicate with other functions 18, which may be relevant to the specific application, but provide no part of the present invention.

In a wireless application, the CPU 12 and DSP 14 are typically both present on-board the mobile device. In normal operation, the DSP 14 processes voice data and provide, by way of example, functionality in the mobile device. However, in contrast to the device of the present invention, the DSP 14 is idling whenever it is not operating a voice service option. Therefore, according to the present invention, the DSP 14 off-loads the CPU 12, which speeds response time while allowing the CPU 12 time to perform other functions for which it is better suited, such as operating user interfaces. Accordingly, the processing time savings to the customer are achieved by the present invention through better utilization of the existing on-board components, without incurring the economic cost of additional equipment.

The CPU 12 includes an application 20, which is unique to the particular implementation of the device. For example, the applications 20 include a music player, or a web browser for use with internet application, or another application having multi-layer, high-overhead protocols. According to the exemplary application described herein for partitioning and implementing cryptographic acceleration functions, the application 20 is, for example, the web browser and utilizes a SSL session in the SSL protocol that appears in the openSSL source code.

The CPU 12 also includes data services interfaces 22, which are the data movement protocols specific to the application 20 implemented on the device. The data services 22 are the communication links between the applications 20 and the operating system on the CPU 12. According to the exemplary embodiment illustrated in FIG. 1, the data services interfaces 22 are the application program interfaces (APIs) between the specific application 20 and the cryptographic function layer, when the cryptographic function is the high level SSL protocols which off-load the acceleration functions to the DSP 14.

The CPU 12 also includes a set of the openSSL source code 24, and cryptographic interfaces 26 between the SSL protocol functions and the specific commands of the DSP 14. A set of DSP APIs 28 for interfacing between the SSL protocols and the DSP functions are also available to CPU 12. The DSP APIs 28 permit the CPU 12 to interface more effectively with the DSP 14, thereby increasing the ease with which the CPU 12 calls an acceleration function in the DSP 14.

Optionally, the software implementation of the invention utilizes the openSSL project source code with modifications that allow acceleration of the primitive cryptographic functions within the DSP 14 (i.e., the cryptographic engine or computational accelerator running on the DSP 14). For example, rather than calling the SSL functions that are accelerated in the DSP 14, such as the cryptographic engines and key exchange/authentication routines, the DSP APIs 28 communicate directly with the DSP 14 for: (1) loading the DSP assembly "image" (i.e., the downloadable executable instructions executed by the DSP 14); (2) inputting the data; (3) initiating execution; and (4) collecting the result.

The cryptographic functions supported include, for example, key exchange routines, authentication/signature routines, and encryption routines. The DSP 14 also utilizes computer methods to enhance, analyze, or otherwise manipulate images, sounds, radar pulses, and other real-world signals. The DSP 14 is programmed to operate general modular math functions 30, such as exponentiation. The DSP 14 is also programmed to operate one or more encryption routines 32, such as a data encryption standard (DES) encryption and/or an international data encryption algorithm (IDEA) encryption. Authentication/signature routines 34, such as hash algorithms SHA-1 and MD-5, are also implemented by the DSP 14.

During a secure session, such as in SSL, the CPU 12 implements the message interaction protocols defined in the SSL standard. When a primitive cryptographic function is required, the CPU 12 downloads the DSP assembly image into the DSP 14 through the shared memory 16. This image contains the DSP executable instructions required to execute the particular cryptographic function. The CPU 12 then inputs the proper data into the shared memory 16 and sends a command to the DSP 14 to execute. When the DSP 14 has completed execution, the CPU 12 is notified and the results are returned via the shared memory 16.

Although described herein utilizing the openSSL project source code, with or without modifications, the invention is optionally practiced using other security protocol code, such as WAP or IPSec.

Some of the common routines used in security protocols are key exchange routines, authentication/signature routines, and encryption routines. The key exchange routines are used to negotiate a common "key" for use in cryptographic traffic engines, which encrypt sensitive data flowing between a client or customer and a server (e.g., a website), wherein the "key" is one or more characters within a set of data that contains information about the set, including its identification. Some common key exchange algorithms include Diffie-Hellman and RSA. Acceleration of the modular exponentiation used in Diffie-Hellman and RSA can be implemented in the DSP 14. As described above, the CPU 12 downloads an image containing the executable instructions that cause the DSP 14 to execute the desired function (i.e., the key exchange algorithm). For modular exponentiation using the function $X=G^a$ modulo P, the base G, exponent a, and modulus P parameters are input to the DSP 14 via the shared memory 16 and output X is provided to the CPU 12 via the shared memory.

The lengths of the parameters are variable and follow those outlined in the SSL specification. The authentication and signature routines are used to prove to the client that the server is an authentic site. Authentication functions may utilize the accelerated modular math functions implemented within the DSP 14, as described above, wherein the inputs to the DSP 14 and the outputs thereof are dependent upon the function implemented. Generally, for the modular math functions 30, the operands are input and the result is output. For specific functions, such as exponentiation, the base, exponent and modulus are input, and the result is output. Thus, the DSP 14 is used to accelerate any function which generally operates more slowly on the CPU 12, including multi-precision addition, subtraction, multiplication, division, and other mathematical functions.

Hash algorithms, such as SHA-1 and MD-5, can also be accelerated in the DSP 14. When hash algorithms are accelerated in the DSP 14, the CPU 12 inputs a block or blocks of 512-bit length data to the shared memory 16, without preprocessing. The image data is downloaded as required to the DSP 14 in the manner described above to permit the DSP 14 to operate on the block(s) of data. Alternatively, the assembly image for operating one or more of the routines accelerated in the DSP 14 are pre-stored in the DSP 14. The output of the hash algorithms is a fixed length packet that is returned to the CPU 12 via the shared memory 16.

Encryption routines are used to encrypt/decrypt traffic data and may utilize the modular math functions 30 implemented within the DSP 14, as described above, whereby unencrypted plain text is encrypted and cipher text is output and/or encrypted cipher text is input and unencrypted plain text is output. Modular exponentiation is also used for encryption in an implementation of the invention, wherein encrypting is accomplished via the RSA algorithm. Furthermore, encryption engines such as those implemented under the DES and other encryption engines, such as the IDEA encryption, or another encryption engine may be implemented in the DSP 14. For example, in DES encryption, the CPU 12 inputs to the DSP 14 a block or blocks of 64-bit length unencrypted plain text, without preprocessing, and receives from the DSP 14 a 64-bit length block of encrypted cipher text. The key length of DES encryption is 56-bits. In DES decryption, the CPU 12 inputs to the DSP 14 a block or blocks of 64-bit length encrypted cipher text, without preprocessing, and receives from the DSP 14 a 64-bit length block of unencrypted plain text. The key length of DES decryption is also 56-bits.

According to IDEA encryption, the CPU 12 inputs to the DSP 14 a block or blocks of 64-bit length unencrypted plain text, without preprocessing, and receives from the DSP 14 a 64-bit length block of encrypted cipher text. The key length of IDEA encryption is 128-bits. In IDEA decryption, the CPU 12 inputs a block or blocks of 64-bit length encrypted cipher text, without preprocessing, to the DSP 14 and receives therefrom a 64-bit length block of unencrypted plain text. The key length of IDEA decryption is also 128 bits.

Figure 2:
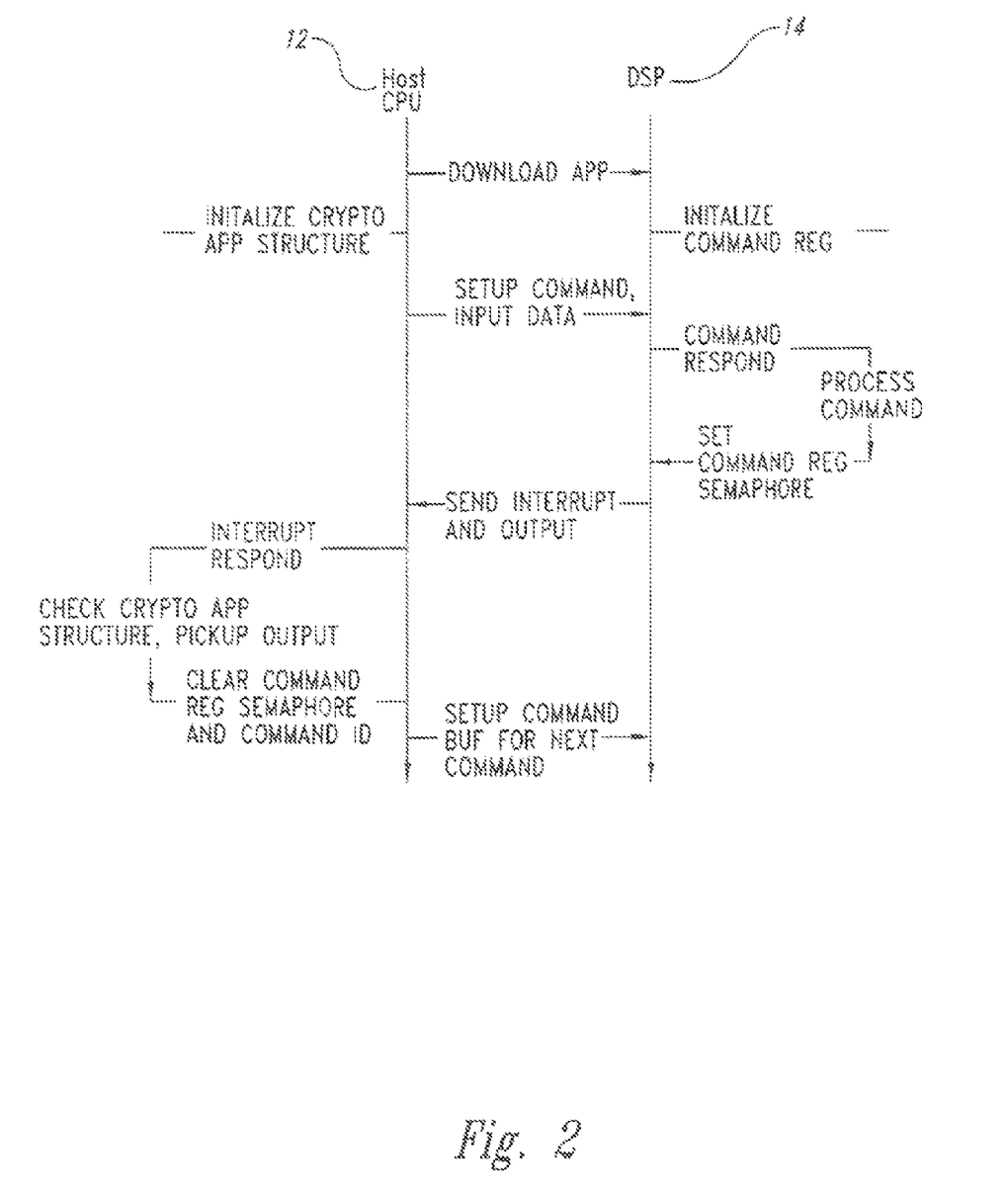
FIG. 2 illustrates a basic flow of the command/response mechanism according to one embodiment of the present invention.

FIG. 2 illustrates a basic flow of the command/response mechanism for one embodiment of the present invention. In FIG. 2, the general accelerator function direction flow between the CPU 12 and the DSP 14 is illustrated. The CPU 12 downloads to the DSP 14 the assembly image file for a particular application 20 implemented by the invention, unless the image file is pre-stored in the DSP 14. In one example of the invention, the security services functions of an e-commerce application are downloaded to the DSP 14. The CPU 12 thereafter initializes the cryptographic application structure while command registers are initialized in the DSP 14. The CPU 12 transmits both setup commands and data to the DSP 14 via the shared memory 16. The setup command is an instruction installation program executed by the DSP 14 to install the current application software and configure it to use DSP hardware properly. The CPU 12 also inputs data useful in the current application (i.e., a particular command that is identified by a "command ID" parameter), such as the operands for an exponentiation function, (i.e., the base, exponent, and modulus data values). The DSP 14 responds to the setup command, and processes the command by executing the specific function using the input data. For example, the DSP 14 executes the exponentiation function using the base, exponent, and modulus input by the CPU 12. When finished processing, the DSP 14 sets a command register semaphore, which is a 'handshake' between the CPU 12 and DSP 14 whereby the CPU 12 informs the DSP 14 which command to execute. The CPU 12 also reads the command register semaphore to determine whether the DSP 14 has properly executed the command. The setting of the command register semaphore is also a showing that the DSP 14 is free for use by other functions. The DSP 14 sends an interrupt to the CPU 12 and outputs to the CPU via the shared memory 16 the results of the function executed, for example, the output of the exponentiation function. The CPU 12 responds to the interrupt, then checks with the cryptographic application structure and retrieves from the shared memory 16 the output of the DSP 14. The CPU 12 then clears the command register semaphore and the command ID. Each DSP 14 assembly image optionally supports various commands, such as encrypt, decrypt, and hash. The DSP 14 is informed by CPU 12 via the command ID which command is to be executed. The CPU 12 then sets up the command buffer with the next command to the DSP 14.

Figure 3:
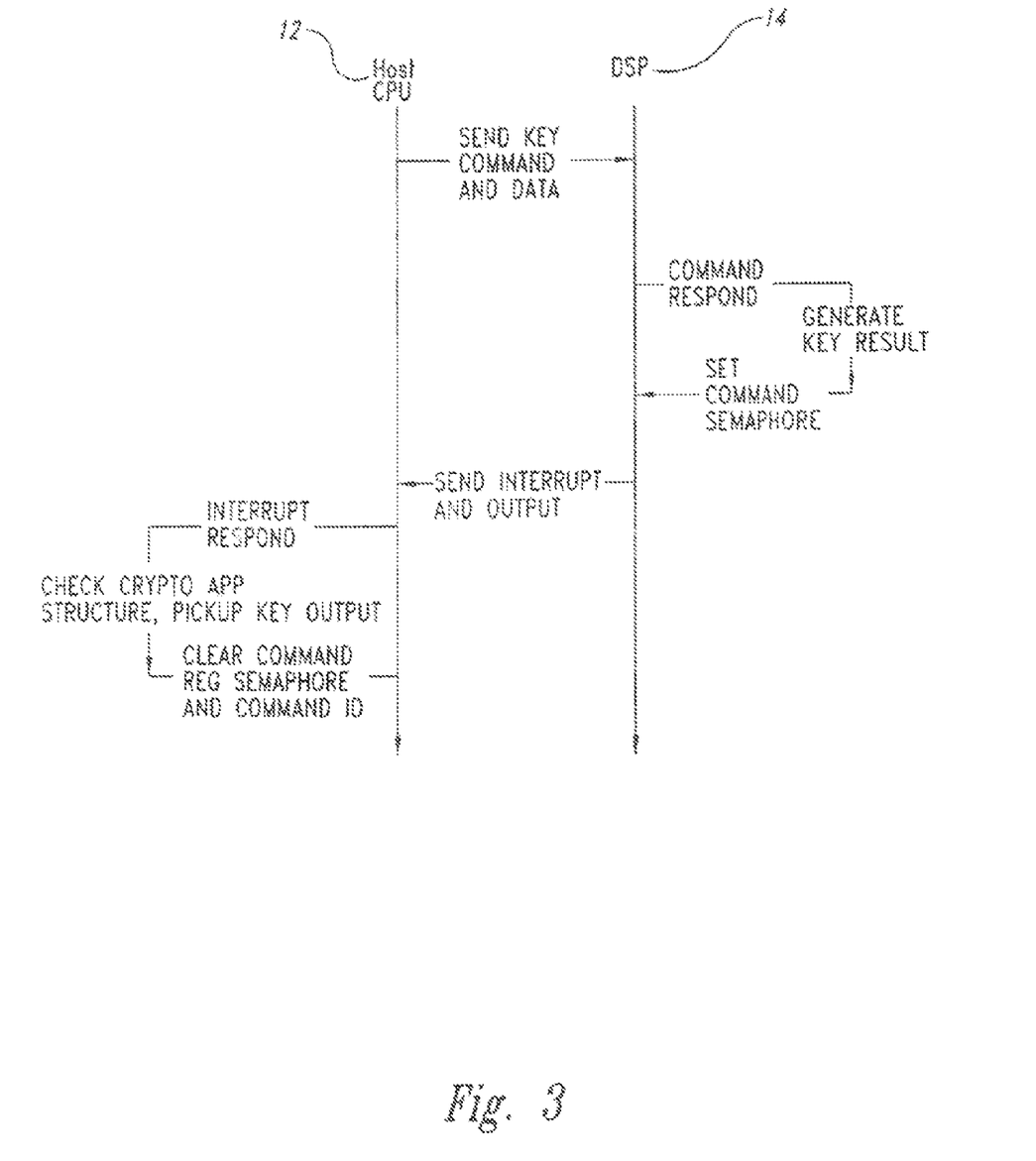
FIG. 3 illustrates a basic flow of a key exchange operational scenario according to one embodiment of the present invention, wherein a digital signal processor operates a key exchange routine for negotiating a common key used in a cryptographic traffic engine.

FIG. 3 illustrates a basic flow of a key exchange operational scenario in which, for example, the DSP 14 operates a key exchange routine for negotiating a common key used in a cryptographic traffic engine. As discussed above, some common key exchange algorithms which may be operated include Diffie-Hellman and RSA. Acceleration of the modular exponentiation used in one of these key exchange algorithms is implemented in the DSP 14. The assembly image file for the key exchange routine is downloaded to the DSP 14, unless it is pre-stored therein. The CPU 12 sends a key exchange setup command and the necessary data to the DSP 14, which responds to the command and operates a key exchange algorithm to generate a key result. Afterward, the DSP 14 sets the command register semaphore, to indicate the successful completion of the task and the availability of the DSP 14 for other tasks. The DSP 14 also sends both an interrupt and the output data of the key exchange routine to the CPU 12. The CPU 12 responds to the interrupt and checks the cryptographic application structure, which is a part of the DSP API 28. The cryptographic application structure includes a set of parameters indicative of the result of both the command and the state of the DSP 14. Thus, the cryptographic application structure includes, but is not limited to, the result of the command. The cryptographic application structure preferably also includes the input data, the output data, and the command ID. The CPU 12 retrieves the output of the key exchange routine and clears the command register semaphore, and the command ID. The DSP 14 is now free to operate other functions.

The operation of the invention relative to the off-loading of other high overhead tasks from the CPU 12 to the DSP 14 is generally similar in flow to the above example of the flow in a key exchange operational scenario.

Figure 4:
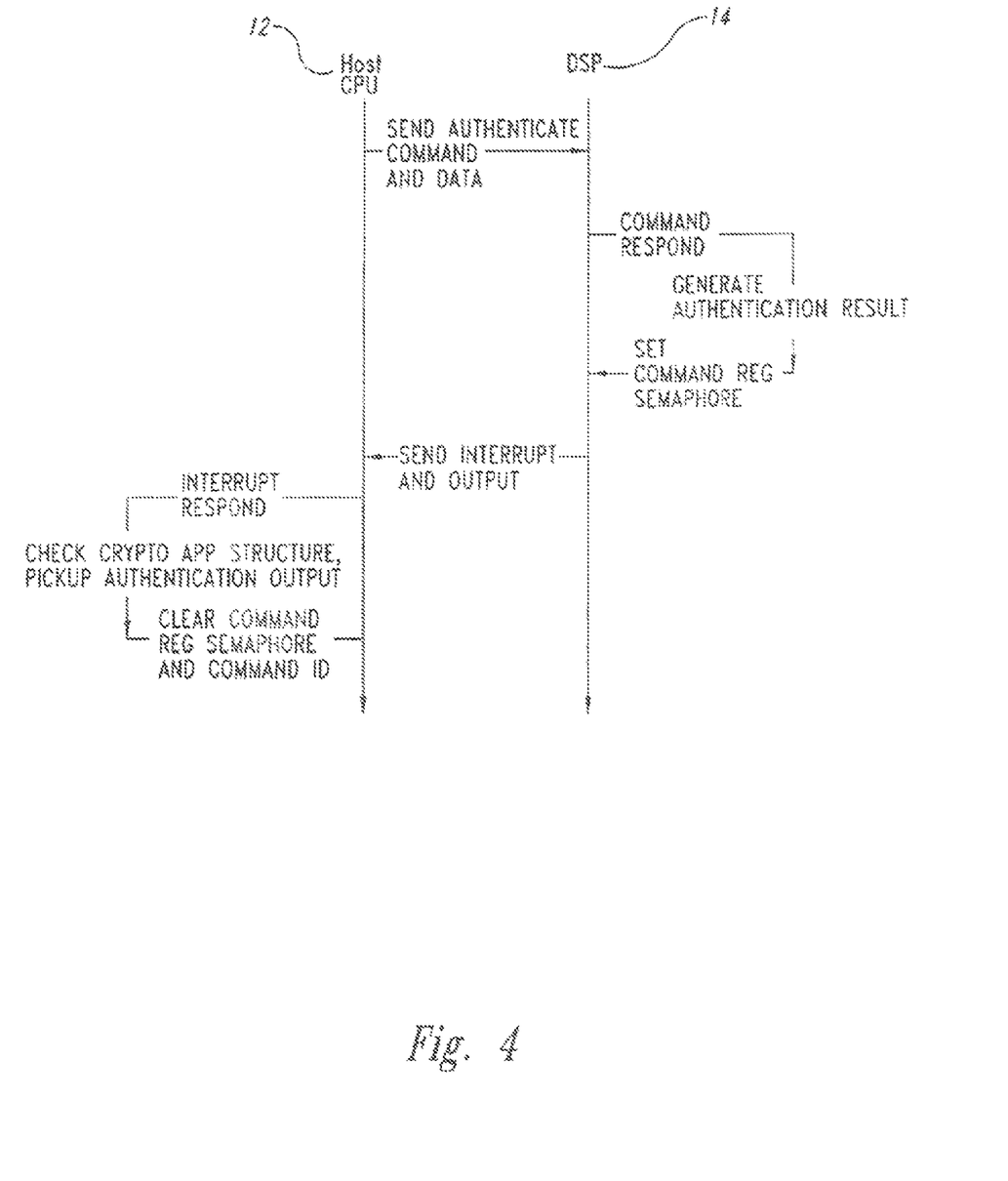
FIG. 4 illustrates a basic flow of an authentication operational scenario according to one embodiment of the present invention, wherein modular math functions are accelerated in a digital signal processor.

FIG. 4 illustrates a basic flow of an authentication operational scenario in which modular math functions are accelerated in the DSP 14. In the authentication operational scenario, the application routine image file is downloaded by the CPU 12 to the DSP 14 via the shared memory 16, unless it is already pre-stored in the DSP 14. The CPU 12 sends an authenticate setup command and the requisite data to the DSP 14 via the shared memory 16 or the DSP API 28. The DSP 14 responds to the command and operates an authentication/signature routine to generate an authentication result. For example, an authentication/signature routine utilizes the accelerated modular math functions implemented within the DSP 14. Following completion of the authentication/signature routine, the command register is set with a semaphore and an interrupt signal is sent with the output of the DSP 14 to the CPU 12 via the shared memory 16. In turn, the CPU 12 responds to the interrupt by breaking off to check the cryptographic application structure and retrieve the authentication output. The CPU 12 then clears the command register semaphore and command ID.

Figure 5:
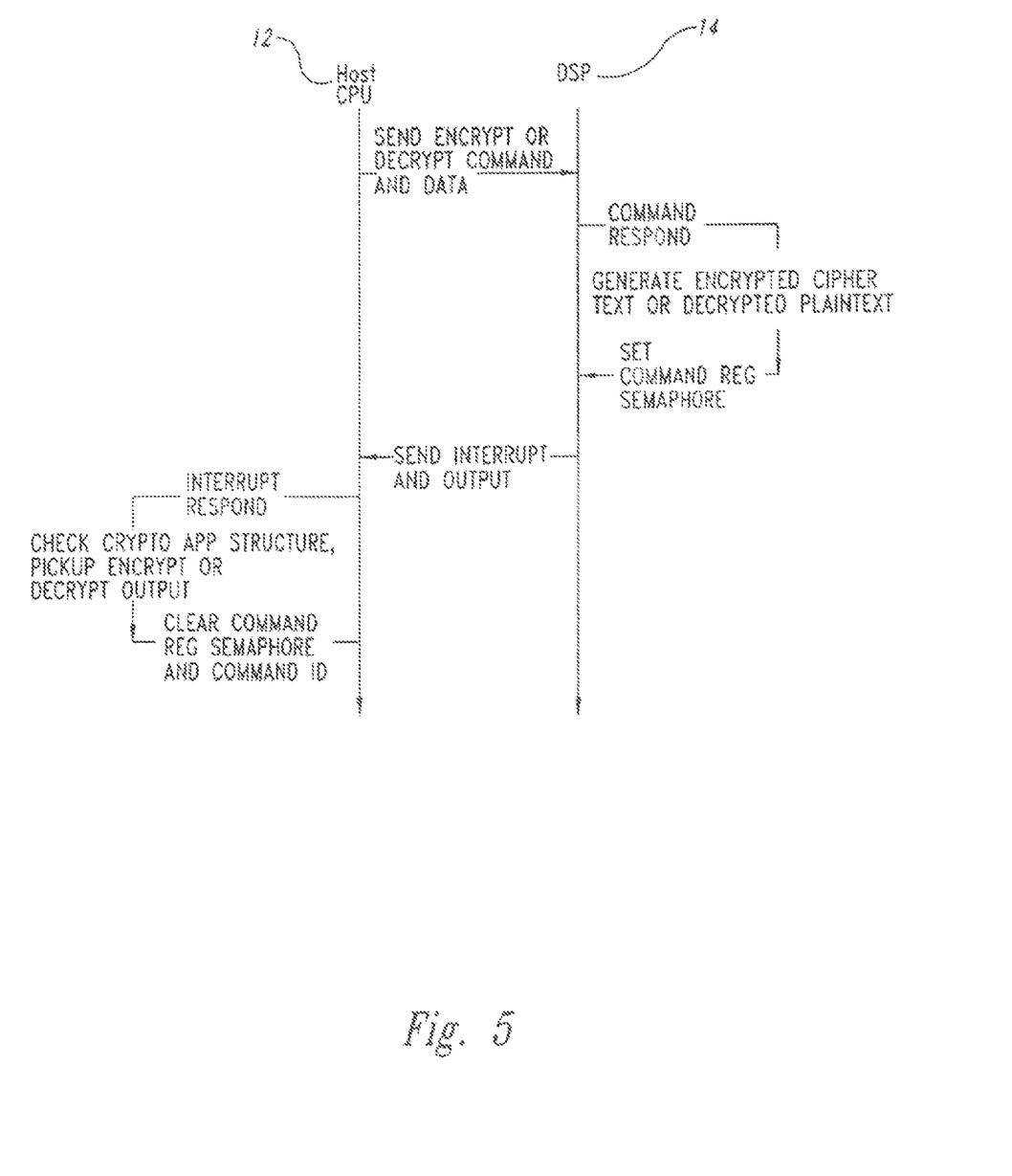
FIG. 5 is an illustration of a basic flow in an encryption or decryption operational scenario according to one embodiment of the present invention, wherein traffic cipher functions are accelerated in a digital signal processor.

FIG. 5 is an illustration of a basic flow in an encryption or decryption operational scenario, wherein the traffic cipher functions (i.e., the encrypt or decrypt functions), are accelerated in the DSP 14. In an encryption or decryption operational scenario, the CPU 12 downloads the appropriate encryption or decryption assembly image file to the DSP 14 via the shared memory 16, unless the image file is pre-stored in the DSP 14. The CPU 12 next sends the encrypt or decrypt command and traffic data to the DSP 14, which responds to the command by operating the modular math functions implemented within the DSP 14, as described above. The DSP 14 generates either encrypted cipher text or decrypted plain text, as appropriate. Afterward, the DSP 14 sets a command register semaphore, which indicates the successful completion of the task as described above, and sends an interrupt and the processed data output to the CPU 12 via the shared memory 16. The CPU 12 breaks off upon receiving the interrupt command to check the cryptographic application structure and retrieve the encrypted or decrypted output. The CPU 12 then clears the command register semaphore and command ID before continuing.

Figure 6:
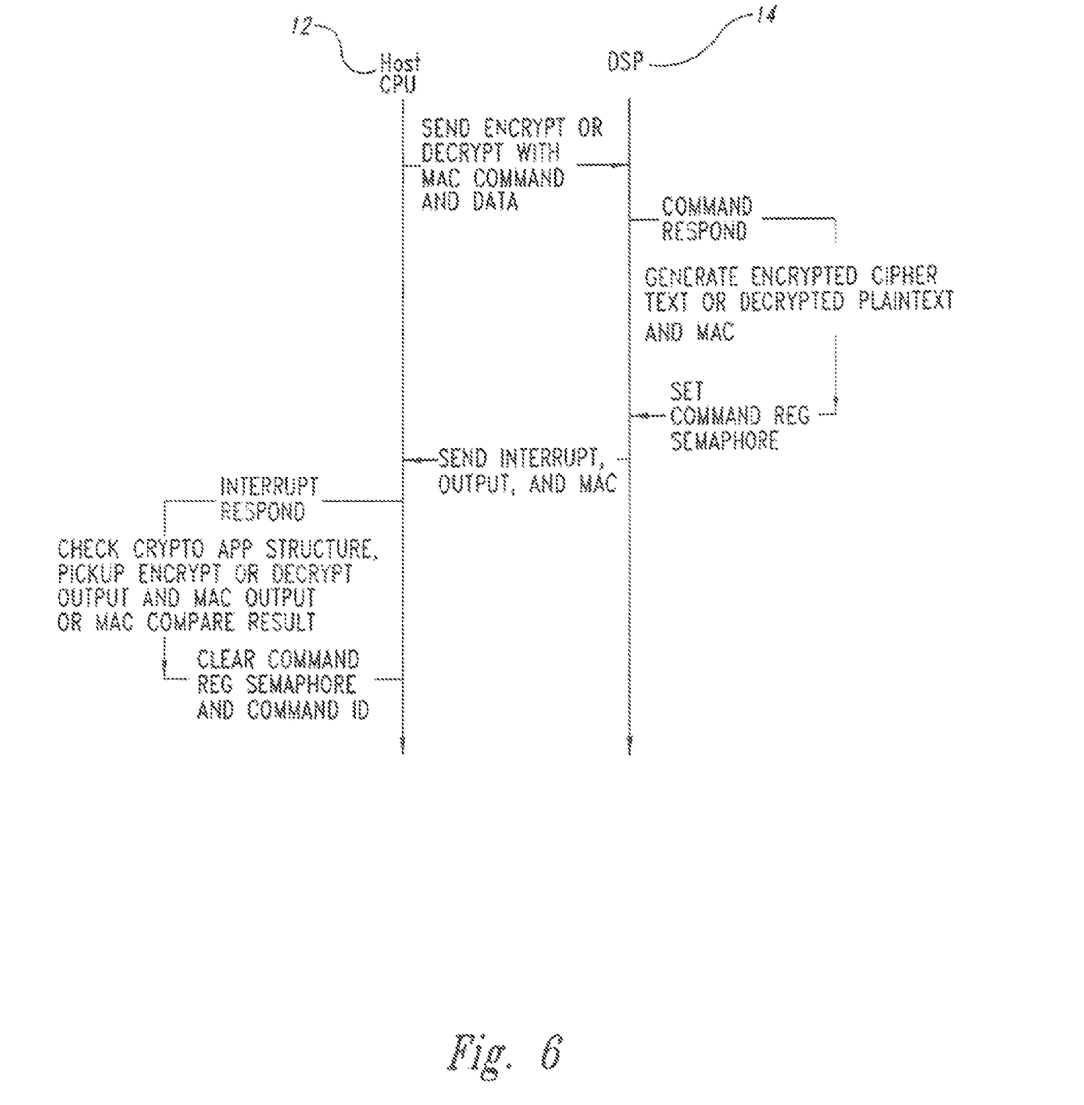
FIG. 6 illustrates a basic flow of an encryption or decryption operational scenario according to one embodiment of the present invention, including additional computations involved in computing a message authentication code.

FIG. 6 illustrates a basic flow of an encryption or decryption operational scenario with additional computations involved in computing a message authentication code (MAC). In the embodiment illustrated in FIG. 5, both the traffic cipher and hash functions are accelerated in the DSP 14. The appropriate application assembly image files are downloaded to the DSP 14 via the shared memory 16, unless they are already pre-stored in the DSP 14. The CPU 12 sends the encrypt or decrypt command along with the MAC command and data to the DSP 14 via the shared memory 16. The DSP 14 responds to the command by operating the appropriate functions and generating encrypted cipher text or decrypted plain text and a MAC before setting the command register semaphore, thereby indicating the successful completion of the task and the availability of the DSP 14 for other tasks. The DSP 14 sends an interrupt, the output of the encryption routine, and the output of the MAC to the CPU 12 via the shared memory 16. The CPU 12 responds to the interrupt by breaking off operations, checking the cryptographic application structure and picking up the encrypted or decrypted output of the DSP 14 from the shared memory 16. The CPU 12 also verifies the MAC output or MAC compare result, then clears the command register semaphore and command ID before continuing operations.

Thus, the system architecture of the circuit 10 takes advantage of the processing power of the DSP 14 and the ability of the DSP 14 to perform certain functions quickly. In wireless communications applications, in particular, the processing power of the DSP 14 is utilized to off-load the CPU 12 and accelerate the complex encryption and authentication algorithms within security protocols. Accordingly, the system architecture of the circuit 10 partitions the cryptographic layers of the security protocols and distributes them to the on-board DSP 14, which returns the result to the CPU 12 in a timely manner without increased equipment costs to the customer.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A mobile device comprising:
 a first processor configured to operate a software application having a multi-layer protocol that may be partitioned into more complex layers and less complex layers, wherein the first processor is configured to operate the less complex layers;
 a second processor configured to process voice data when the second processor is operating a voice service option, configured to operate one of the more complex layers for the benefit of the first processor according to a command received from the first processor when the second processor is not operating the voice service option, and configured to provide a result of the operation of one of the more complex layers to the first processor; and
 a memory accessible to each of the first processor and the second processor for passing commands and data between the first processor and the second processor to permit the second processor to operate the one of the more complex layers for the benefit of the first processor.

2. The mobile device of claim 1 wherein the first processor operates a multi-layer security protocol.

3. The mobile device of claim 1 wherein the second processor is configured to operate a mathematical algorithm layer of the multi-layer protocol.

4. The mobile device of claim 1 wherein the second processor further comprises a digital signal processor.

5. The mobile device of claim 4 wherein the digital signal processor is further configured to operate a modular math function.

6. The mobile device of claim 5 wherein the digital signal processor is further configured to operate a modular math function comprising an exponentiation function.

7. A circuit for a mobile device, the circuit comprising:
 a first processor configured to operate a software application having a multi-layer protocol that may be partitioned into more complex layers and less complex layers, wherein the first processor is configured to operate the less complex layers;
 a second processor configured to process voice data when the second processor is operating a voice service option, configured to operate one of the more complex layers for the benefit of the first processor according to a command received from the first processor when the second processor is not operating the voice service option, and configured to provide a result of the operation of one of the more complex layers to the first processor; and a memory accessible to each of the first processor and the second processor for passing commands and data between the first processor and the second processor to permit the second processor to operate the one of the more complex layers for the benefit of the first processor.

8. The circuit of claim 7 wherein the first processor operates a multi-layer security protocol.

9. The circuit of claim 7 wherein the second processor is configured to operate a mathematical algorithm layer of the multi-layer protocol.

10. The circuit of claim 7 wherein the second processor further comprises a digital signal processor.

11. The circuit of claim 10 wherein the digital signal processor is further configured to operate a modular math function.

12. The circuit of claim 11 wherein the digital signal processor is further configured to operate a modular math function comprising an exponentiation function.

13. A mobile device, comprising:
   first means for operating a software application having a multi-layer protocol that may be partitioned into more complex layers and less complex layers, and for operating the less complex layers;
   second means for processing voice data when the second means is operating a voice service option, for operating one of the more complex layers for the benefit of the first means according to a command received from the first means when the second means is not operating the voice service option, and for providing a result of the operation of one of the more complex layers to the first means; and
   third means for passing commands and data between the first means and the second means to permit the second means to operate the one of the more complex layers for the benefit of the first means.

14. A non-transitory computer-readable medium including program code stored thereon, comprising:
   program code to cause a first processor to operate a software application having a multi-layer protocol that may be partitioned into more complex layers and less complex layers, wherein the first processor is configured to operate the less complex layers;
   program code to cause a second processor to process voice data when the second processor is operating a voice service option, to operate one of the more complex layers for the benefit of the first processor according to a command received from the first processor when the second processor is not operating the voice service option, and to provide a result of the operation of one of the more complex layers to the first processor; and
   program code to utilized a memory, accessible to each of the first processor and the second processor, for passing commands and data between the first processor and the second processor to permit the second processor to operate the one of the more complex layers for the benefit of the first processor.

* * * * *